United States Patent [19]
Duh

[11] Patent Number: 5,327,746

[45] Date of Patent: Jul. 12, 1994

[54] ICE CONTAINER FOR AN ICE-STORAGE TYPE AIR CONDITIONING SYSTEM

[76] Inventor: Shi-Chin Duh, 7F, No. 480, Sec. 5, Chung-Hsiao E. Rd., Taipei City, Taiwan

[21] Appl. No.: 958,216

[22] Filed: Oct. 9, 1992

[51] Int. Cl.$^5$ ............................................. F28D 20/00
[52] U.S. Cl. ...................................... 62/530; 62/430; 62/457.2
[58] Field of Search ...................... 62/530, 529, 457.1, 62/457.2, 457.3, 327, 59, 1, 430, 438

[56] References Cited

U.S. PATENT DOCUMENTS

| | | | |
|---|---|---|---|
| 490,902 | 1/1893 | Galbreath | 62/529 |
| 1,727,187 | 9/1929 | Weinrich | 62/530 |
| 2,160,165 | 5/1939 | Patterson | 62/457.1 |
| 3,773,031 | 11/1973 | Laing et al. | 62/430 |
| 4,856,296 | 8/1989 | Shu | 62/430 |
| 4,924,935 | 5/1990 | Van Winckel | 62/430 |
| 4,951,739 | 8/1990 | Cates et al. | 62/430 |

Primary Examiner—Henry A. Bennett
Assistant Examiner—William C. Doerrler
Attorney, Agent, or Firm—Jacobson, Price, Holman & Stern

[57] ABSTRACT

An ice container for an ice-storage type air conditioning system includes a sealed plastic housing containing water therein. The housing has a plurality of elongated slots formed uniformly in the entire outer surface thereof. When the water in the housing is frozen, the bottom walls of the slots expand to increase the capacity of the housing. The bottom walls of the slots are arranged and sized so that the slots can remain in the outer surface of the housing when the water in the outer housing is frozen. The housing has a groove formed in one end surface thereof, and a tongue projecting outward from the other end surface thereof. The tongue of one housing can be inserted into the groove of another housing so that a plurality of the housings can be arranged in a row.

12 Claims, 3 Drawing Sheets

ICE CONTAINER FOR AN ICE-STORAGE TYPE AIR CONDITIONING SYSTEM

BACKGROUND OF THE INVENTION

1. Field of the Invention

This invention relates to a variable-capacity ice container for an ice-storage type air conditioning system, and more particularly to an ice container with a plurality of elongated slots formed in the outer surface thereof, which slots prevent substantial volumetric expansion of the ice container when the water in the ice container is frozen.

2. Description of the Related Art

Referring to FIG. 1, a conventional ice container includes a spherical plastic housing (10) with a plurality of circular depressions (11) formed uniformly in the entire outer surface thereof. Referring to FIG. 2, another conventional ice container includes an elongated plastic housing (12) having a bellows-like portion (13). A plurality of the spherical ice containers or the elongated ice containers are placed in a large container through which the circulating coolant of the ice-storage air conditioning system flows to interact with the ice containers so as to perform heat exchange. When the air conditioning system is not in use, the ice containers are cooled to freeze the water in the ice containers. When the air conditioning system is in use, heat is transferred from the circulating coolant to the ice in the ice containers and melts the ice. When the water in the ice container of FIG. 1 is frozen, the ice pushes against the wall of the ice container at the circular depressions (11) to form protrusions on the outer surface of the housing (10). When the water in the ice container of FIG. 2 is frozen, the small-diameter portions of the bellows-like portion (13) expand so that two ends of the housing (12) extend outward, thereby increasing the length of the ice container. As a result, the solidification of the water in the ice container causes substantial capacity increment and volumetric expansion of the ice container. Subsequently, when the ice in the ice container melts, the housing returns to the original shape, thereby reducing the capacity and volume of the ice container.

Substantial volumetric periodic expansion and contraction of the ice containers cause difficulties in positioning the ice containers within the large container and result in frequent friction between the ice containers, thereby damaging or even breaking the ice containers. Because it is difficult to position the ice containers in an orderly manner in the large container, the circulating coolant cannot flow uniformly over all of the ice containers, the water in many of the ice containers might not be frozen, thus decreasing the heat transfer efficiency between the ice containers and the circulating coolant.

SUMMARY OF THE INVENTION

An object of this invention is to provide an ice container which has an unchangeable volume and a good heat exchange efficiency.

Another object of this invention is to provide a positioning device for ice containers which can maintain the relative position of the ice containers in a large container for an ice-storage type air conditioning system.

According to this invention, an ice container for an ice-storage type air conditioning system includes a sealed plastic housing containing water therein. The housing has a plurality of elongated slots formed uniformly in the entire outer surface thereof. When the water in the housing is frozen, the bottom walls of the slots expand to increase the capacity of the housing. The bottom walls of the slots are arranged and sized so that the slots can remain in the outer surface of the housing when the water in the outer housing is frozen, thus preventing formation of projections on the outer surface of the housing. The formation of the projections causes substantial volumetric expansion of the housing. The outer housing has a groove formed in one end surface thereof, and a tongue projecting outward from the other end surface thereof. The tongue of one housing can be inserted into the groove of another housing so that a plurality of the housings can be arranged in a row.

BRIEF DESCRIPTION OF THE DRAWING

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 3:
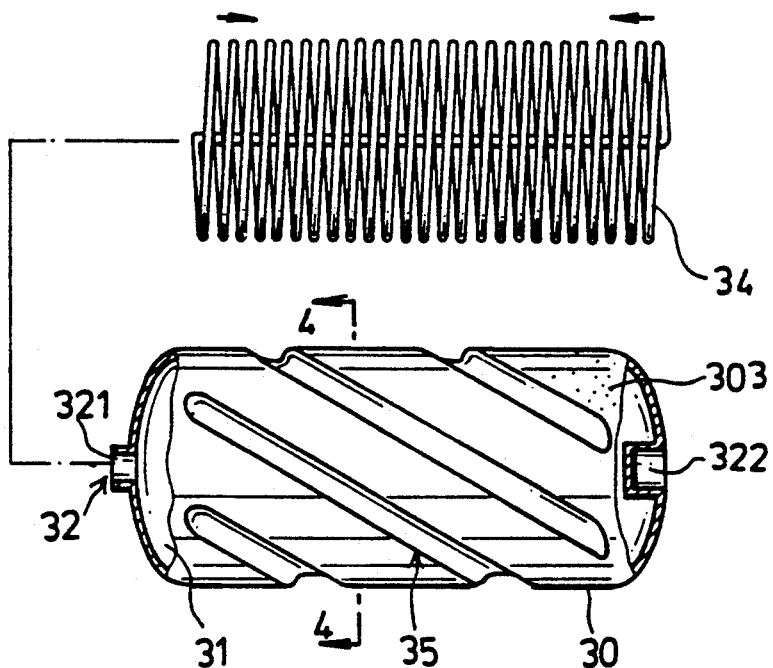
FIG. 3 is an exploded view illustrating an ice container for an ice-storage type air conditioning system according to this invention.
Figure 4:
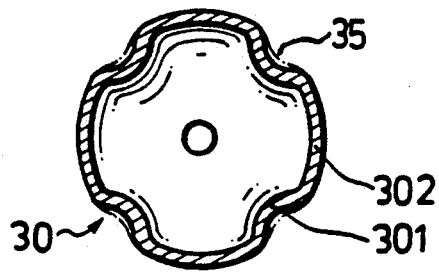
FIG. 4 is a sectional view taken along Line 4—4 in FIG. 3, illustrating the expansion of the bottom walls of the slots according to this invention.

Referring to FIGS. 3 and 4, an ice container of this invention includes a sealed plastic housing (30), a coiled metal heat conductor (34) and a plurality of slots (35) which are formed uniformly in the entire outer surface of the housing (30).

The outer housing (30) is generally cylindrical and has an internal chamber (31) in which water or any other suitable liquid is contained. A positioning device consists of a cylindrical tongue (321) projecting outward from one end surface of the housing (30), and a circular groove (322) formed in the other end surface of the housing (30) in alignment with the tongue (321). The tongue (321) of one housing (30) can be inserted into the groove (322) of another housing (30) so that said two housings (30) can be arranged in a row. In this way, several ice containers can be positioned in a row so that a plurality of housings (30) can be arranged in order in a large container for an ice-storage type air conditioning system, thereby maximizing the number of the ice containers in the large container. When the ice containers are interconnected by means of the positioning devices, the circulating coolant can flow uniformly over all of the ice containers in the large container, thereby increasing the heat exchange efficiency of the air conditioning system.

Figure 1:
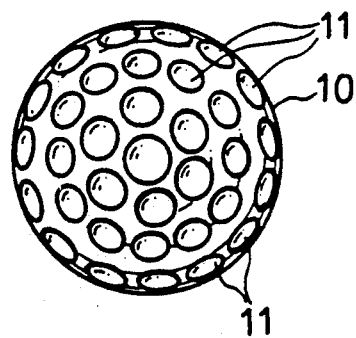
FIG. 1 is a perspective view of a conventional ice container for an ice-storage type air conditioning system.
Figure 2:
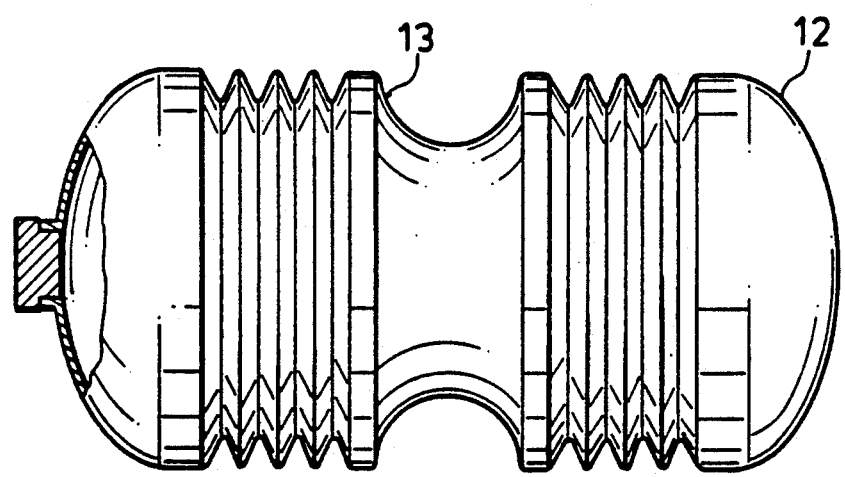
FIG. 2 is a schematic view illustrating another conventional ice container for an ice-storage type air conditioning system.
Figure 5:
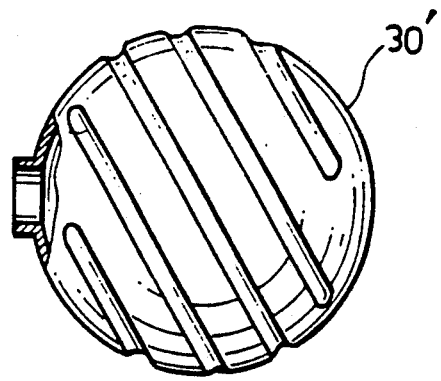
FIG. 5 is a partially exploded view of another ice container for an ice-storage type air conditioning system according to this invention.

As best shown in FIG. 4, the bottom walls (301) of the slots (35) have the same thickness as the wall (302) of the housing (30) and are expandable and contractible in response to the conversion of water to ice and vice-versa in the housing (30) in such a manner that the depth of slots (35) in the outer surface of the housing (30) is reduced or increased. As illustrated, when the water in the housing (30) is frozen, the bottom walls (301) of the housing (30) expand to the position indicated by phantom lines in FIG. 4. As also clearly shown in FIG. 4, the slots are spaced apart angularly at 90° intervals. The shape of the housing (30) may be modified into the form shown in FIG. 5, which is an oval shape (30'). Preferably, some metal powders (303) (see FIG. 1) are distributed uniformly in the plastic housing (30) so as to increase the heat transfer efficiency of the ice container.

The coiled heat conductor (34) is compressed to be placed into the housing (30). The heat conductor (34) thus presses against the inner wall of the housing (30). With the heat conductor (34) disposed in the housing (30), the water in the outer housing (30) can be easily frozen into ice which is initially formed on the heat conductor (34). As a consequence, the interengaging area between the heat conductor (34) and the inner wall of the housing (30) is increased, thereby providing a good heat transfer efficiency therebetween.

Figure 6:
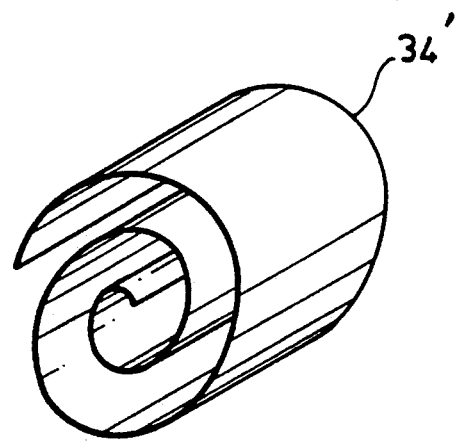
FIG. 6 is a perspective view showing an alternative design of the heat conductor of the ice container according to this invention, which heat conductor is shaped in the form of a convoluted plate.

Alternatively, the coiled heat conductor (34) may be replaced with the heat conductor (34') shown in FIG. 6, which is shaped in the form of a convoluted plate. The heat conductor (34') is also made of metal and presses against the inner wall of the housing (30) by a spring restoration force.

Figure 7:
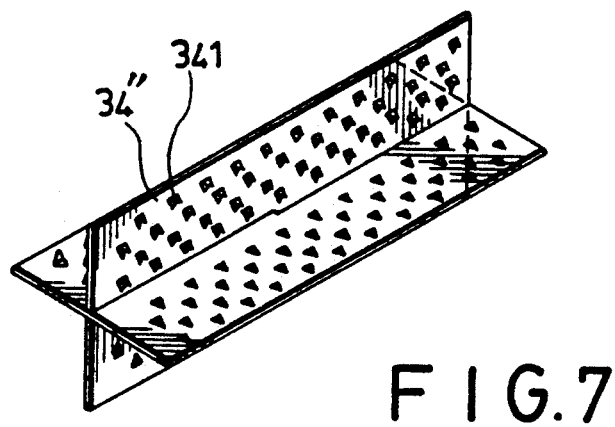
FIG. 7 is a perspective view showing another alternative design of the heat conductor of the ice container according to this invention, which heat conductor is shaped in the form of a cross-shaped plate.

Referring to FIG. 7, another metal heat conductor (34") may also substitute for the coiled heat conductor (34). As illustrated, the heat conductor (34") has a cross-shaped plate body which consists of two rectangular plates intersecting at the middle portions thereof. A plurality of metal sharp projections (341) protrude from the plates.

The slots (35) are sized and arranged in the outer surface of the housing (30) according to the volumetric difference between the liquid and the solid states of water in the ice container so that the bottom walls (301) of the slots (35) will not project from the surface of the outer housing (30) when the ice pushes the bottom walls (301) of the slots (35) radially outward, thereby preventing substantial volumetric expansion of the housing (30). In other words, when the water in the housing (30) is frozen to become ice, the slots (35) remain in the outer surface of the housing (30) in such a manner that the depth of the slots (35) is reduced. The expansion of the bottom walls (301) of the slots (35) increases the capacity of the housing (30) or the volume of the chamber (31). When the ice in the outer (30) melts, the bottom walls (301) of the slots (35) contract to their original positions. Because the outer diameter of the housing (30) does not change during the water-ice phase change, the ice container will not move in the large container even when the tongue (321) of one ice container is not engaged within the groove (322) of another ice container. Accordingly, possible damage to the housing (30) caused by friction is minimized so that the life time of the ice container is increased.

With this invention thus explained, it is apparent that numerous modifications and variations can be made without departing from the scope and spirit of this invention. It is therefore intended that this invention be limited only as indicated in the appended claims.

I claim:

1. An ice container for an ice-storage type air conditioning system, comprising a sealed plastic housing adapted to contain water therein, and housing having a plurality of parallel elongated helical slots formed uniformly around an outer surface thereof, each of said slots having a bottom wall which is expandable when the water in said housing is frozen to become ice, and which is contractible when the ice in said housing is melted, the bottom walls of said slots being arranged and sized so that said slots can remain in said outer surface of said housing when the water in said outer housing is frozen, thus preventing formation of projections on said outer surface of said housing, the formation of said projections causing substantial volumetric expansion of said outer housing wherein the slots each have a width smaller than a distance between adjacent slots.

2. An ice container as claimed in claim 1, wherein a metal heat conductor is accommodated within said housing so as to facilitate solidification of the water in said housing.

3. An ice container as claimed in claim 2, wherein said housing is generally cylindrical, said heat conductor being coiled and pressing against an inner wall of said housing so as to increase interengaging area between said heat conductor and the inner wall of said outer housing.

4. An ice container as claimed in claim 2, wherein said housing is generally cylindrical, said heat conductor being shaped in the form of a convoluted plate which presses against an inner wall of said housing so as to increase interengaging area between said heat conductor and the inner wall of said housing.

5. An ice container as claimed in claim 2, wherein said housing is generally cylindrical, said heat conductor having a cross-shaped plate body, and a plurality of metal sharp projections protruding from said cross-shaped plate body.

6. An ice container as claimed in claim 2, wherein said housing is shaped in the form of an oval, said heat conductor being coiled and pressing against an inner wall of said housing so as to increase interengaging area between said heat conductor and the inner wall of said housing.

7. An ice container as claimed in claim 2, wherein said housing is shaped in the form of an oval, said heat conductor being shaped in the form of a convoluted plate which presses against an inner wall of said housing so as to increase interengaging area between said heat conductor and the inner wall of said housing.

8. An ice container as claimed in claim 2, wherein said housing is shaped in the form of an oval, said heat conductor having a cross-shaped plate body, and a plurality of metal sharp projections protruding from said cross-shaped plate body.

9. An ice container as claimed in claim 1, wherein said housing has two end surfaces and includes a groove formed in one of said two end surfaces, and a tongue projecting outward from the other of said two end surfaces, whereby, said tongue of one said housing can be engaged within said groove of another said housing so as to arrange a plurality of said outer housings in a row.

10. An ice container as claimed in claim 1, wherein said outer housing includes some metal powders distributed uniformly therein so as to increase heat transfer efficiency of said outer housing.

11. An ice container as claimed in claim 1, wherein each slot has opposite ends spaced apart from one another by an angle of about 90°.

12. An ice container as claimed in claim 1, wherein the slots are spaced apart angularly at 90° intervals.

* * * * *